US010018104B2

(12) United States Patent
Grover, Jr. et al.

(10) Patent No.: US 10,018,104 B2
(45) Date of Patent: Jul. 10, 2018

(54) COMBUSTION IGNITION DEVICE FOR AN INTERNAL COMBUSTION ENGINE

(71) Applicant: GM GLOBAL TECHNOLOGY OPERATIONS LLC, Detroit, MI (US)

(72) Inventors: Ronald O. Grover, Jr., Northville, MI (US); Cherian A. Idicheria, Novi, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/350,661

(22) Filed: Nov. 14, 2016

(65) Prior Publication Data

US 2018/0135506 A1    May 17, 2018

(51) Int. Cl.
| F02P 23/00 | (2006.01) |
| F02B 19/12 | (2006.01) |
| F02P 9/00  | (2006.01) |
| H05H 1/24  | (2006.01) |

(52) U.S. Cl.
CPC ............ *F02B 19/12* (2013.01); *F02P 9/007* (2013.01); *H05H 1/2406* (2013.01)

(58) Field of Classification Search
CPC ......... F02B 19/12; F02B 19/108; F02P 9/007; F02P 23/04; H05H 1/2406; F02M 57/06
USPC .................. 123/260, 297, 143 B, 274, 275
See application file for complete search history.

(56) References Cited

U.S. PATENT DOCUMENTS

| 5,522,357 A *  | 6/1996  | Nogi ......................... F02B 1/10 123/261 |
| 5,560,326 A *  | 10/1996 | Merritt .................... F02B 19/02 123/259 |
| 7,025,036 B2 * | 4/2006  | Lampard ................. F02B 19/02 123/261 |
| 8,910,612 B2 * | 12/2014 | Woo ......................... F02B 19/06 123/267 |
| 9,194,402 B2 * | 11/2015 | Rohs ...................... F01B 3/0002 |
| 2005/0247283 A1* | 11/2005 | Lampard ................. F02B 19/02 123/288 |

(Continued)

FOREIGN PATENT DOCUMENTS

| WO | 2015130655 A1   | 9/2015 |
| WO | WO 2016/075361 A1 * | 5/2016 ............. F02P 23/04 |

OTHER PUBLICATIONS

Attard, Fraser, Parsons; "A Turbulent Jet ignition Pre-Chamber Combustion System for Large Fuel Economy Improvements in a Modern Vehicle Powertrain"; SAE International 2010-01-1457; Published May 5, 2010.

*Primary Examiner* — Hai Huynh
(74) *Attorney, Agent, or Firm* — Quinn IP Law

(57) ABSTRACT

An internal combustion engine includes a combustion chamber formed by cooperation of a cylinder bore formed in a cylinder block, a cylinder head and a piston. A combustion ignition device is disposed in the combustion chamber and includes a nozzle defining a pre-chamber, a barrier discharge plasma igniter, including a tip portion disposed in the pre-chamber and a plurality of apertures disposed in the nozzle. The pre-chamber is in fluidic communication with the combustion chamber via the plurality of apertures. A controller is in communication with the engine and the barrier discharge plasma igniter.

15 Claims, 2 Drawing Sheets

(56) References Cited

U.S. PATENT DOCUMENTS

| | | | |
|---|---|---|---|
| 2006/0219210 A1* | 10/2006 | Bailey | F02B 19/06 123/259 |
| 2009/0025670 A1* | 1/2009 | Filipek | F02B 23/0657 123/169 R |
| 2010/0192909 A1* | 8/2010 | Ikeda | F02B 23/0657 123/436 |
| 2010/0258097 A1* | 10/2010 | Takahashi | F01L 13/0026 123/609 |
| 2012/0060791 A1* | 3/2012 | Woerner | F02B 19/12 123/260 |
| 2016/0195041 A1 | 7/2016 | Kim | |
| 2016/0252007 A1 | 9/2016 | Ge et al. | |
| 2016/0348636 A1* | 12/2016 | Ghosh | F02P 23/04 |
| 2017/0074224 A1* | 3/2017 | Ge | F02B 19/12 |

* cited by examiner

COMBUSTION IGNITION DEVICE FOR AN INTERNAL COMBUSTION ENGINE

INTRODUCTION

Spark-ignition (SI) engines introduce an air/fuel mixture into each cylinder that is compressed during a compression stroke and ignited by a spark plug. SI engines may operate in different combustion modes, including, by way of non-limiting examples, a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air/fuel mixture, i.e., lean of a stoichiometric air/fuel point, with relatively low peak combustion temperatures, resulting in low NOx emissions.

SUMMARY

An internal combustion engine is described and includes a combustion chamber formed by cooperation of a cylinder bore formed in a cylinder block, a cylinder head and a piston. A combustion ignition device is disposed in the combustion chamber and includes a nozzle defining a pre-chamber, a barrier discharge plasma igniter, including a tip portion disposed in the pre-chamber and a plurality of apertures disposed in the nozzle. The pre-chamber is in fluidic communication with the combustion chamber via the plurality of apertures. A controller is in communication with the engine and the barrier discharge plasma igniter.

An aspect of the disclosure includes an air injector including a tip portion that is disposed to inject air into the pre-chamber of the combustion ignition device.

Another aspect of the disclosure includes a fuel injector including a tip portion that is disposed to inject fuel into the pre-chamber of the combustion ignition device.

Another aspect of the disclosure includes a controller that is operatively connected to the internal combustion engine and the barrier discharge plasma igniter, wherein the controller includes an instruction set that is executable to activate the barrier discharge plasma igniter to enhance reactivity of a lean fuel/air mixture contained in the pre-chamber.

Another aspect of the disclosure includes a controller that is operatively connected to the internal combustion engine and the barrier discharge plasma igniter, wherein the controller includes an instruction set that is executable to activate the barrier discharge plasma igniter to ignite a fuel/air mixture contained in the pre-chamber.

Another aspect of the disclosure includes the barrier discharge plasma igniter including an electrode including a tip portion that is encapsulated in a dielectric material, and being electrically connected to an electrical ground path that is connected to the engine.

Another aspect of the disclosure includes the plasma ignition controller being disposed to execute a plasma discharge event in the combustion chamber via the barrier discharge plasma igniter.

Another aspect of the disclosure includes the plasma ignition controller being disposed to apply a high-frequency, high-voltage electrical pulse to the barrier discharge plasma igniter.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material in the related art has not been described in detail in order to avoid unnecessarily obscuring the disclosure. Furthermore, the drawings are in simplified form and are not to precise scale. For purposes of convenience and clarity, directional terms may be used with respect to the drawings. These and similar directional terms are not to be construed to limit the scope of the disclosure. Furthermore, the disclosure, as illustrated and described herein, may be practiced in the absence of an element which is not specifically disclosed herein.

As employed herein, the term "upstream" and related terms refer to elements that are towards an origination of a flow stream relative to an indicated location, and the term "downstream" and related terms refer to elements that are away from an origination of a flow stream relative to an indicated location.

Figure 1:
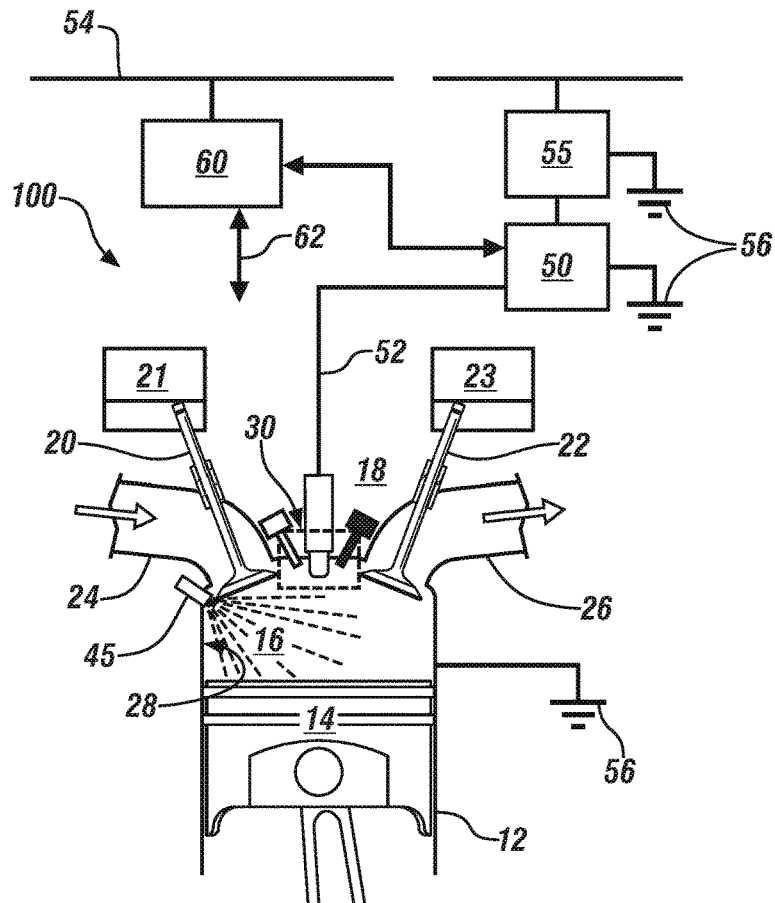
FIG. 1 schematically illustrates a cross-sectional view of an embodiment of a single cylinder for an internal combustion engine including a combustion ignition device that includes an in-cylinder dielectric barrier-discharge plasma igniter and a plasma ignition controller of a plasma ignition system, in accordance with the disclosure.

Referring now to the drawings, wherein the depictions are for the purpose of illustrating certain exemplary embodiments and not for the purpose of limiting the same, FIG. 1 schematically illustrates a cross-sectional view of a single cylinder for a multi-cylinder internal combustion engine (engine) 100 and an associated engine controller (ECM) 60. The engine 100 includes an engine block 12 defining a plurality of cylinder bores 28 containing movable pistons 14, one of which is shown. A cylinder head 18 is disposed on a nominal top portion of the engine block 12 and a rotating crankshaft (not shown) is disposed at a nominal bottom portion of the engine block 12. Each of the cylinder bores 28 houses one of the movable pistons 14. The walls of the cylinder bore 28, a top portion of the piston 14 and an inner exposed portion of the cylinder head 18 define outer boundaries of a variable-volume combustion chamber 16 that is disposed therein. Each piston 14 mechanically couples to a connecting rod that rotatably couples to the crankshaft, and the piston 14 slidably translates within the cylinder bore 28 in reciprocating motion between a top-dead-center (TDC) position and a bottom-dead-center (BDC) position to transfer mechanical power to the crankshaft during each combustion cycle. The engine 100 preferably operates in a four-stroke combustion cycle that includes repetitively executed intake, compression, expansion and exhaust strokes, wherein the strokes are associated with translation of the piston 14 with the cylinder bore 28. Operation of the engine 100 is controlled by the ECM 60, which communicates with a fuel injection system to control a fuel injector 45 to inject fuel, and communicates with a plasma ignition controller 50 via line 62 to control operation of a combustion ignition device 30 that includes a dielectric barrier-discharge plasma igniter (plasma igniter) 31 that is partially disposed in-cylinder. In one embodiment, the plasma igniter 31 is configured as a groundless dielectric barrier-discharge plasma igniter, although the concepts described herein are not so limited. As used herein, the term "groundless" indicates absence of a discrete element or structure proximal to the plasma igniter 31 that would be capable of electrically coupling to an electrical ground path. Details of the combustion ignition device 30 are shown with reference to FIG. 2. The combustion ignition device 30 including an embodiment of the plasma igniter described herein is preferably employed as a substitute for a spark ignition module and spark plug, and facilitate operation at lean air/fuel ratios, including operation in HCCI and other combustion modes.

The cylinder head 18 includes an intake port or runner 24 that is in fluid communication with the combustion chamber 16, with an intake valve 20 disposed within for controlling airflow into the combustion chamber 16. The cylinder head 18 also includes an exhaust port or runner 26 that is in fluid communication with the combustion chamber 16, with an exhaust valve 22 disposed within for controlling exhaust gas flow out of the combustion chamber 16. FIG. 1 shows a single intake valve 20 and a single exhaust valve 22 associated with the combustion chamber 16, but it is appreciated that each combustion chamber 16 may be configured with multiple intake valves and/or multiple exhaust valves. Engine airflow may be controlled by selectively adjusting position of a throttle valve (not shown) and adjusting openings and/or closings of the intake valves 20 and the exhaust valves 22 in relation to piston positions. An intake variable valve actuation system 21 is arranged to control openings and closings of the intake valves 20, and an exhaust variable valve actuation system 23 is arranged to control openings and closings of the exhaust valves 22. The intake and exhaust variable valve actuation systems 21, 23 may include variable cam phasing and a selectable multi-step valve lift, e.g., multiple-step cam lobes that provide two or more valve lift positions, and employ urgings of valve springs and lobes on one or more rotating camshafts that are rotatably coupled to the crankshaft, or other suitable mechanisms to effect such control. The change in valve position of the multi-step valve lift mechanism may be a discrete step change.

The cylinder head 18 may be arranged to provide structure for mounting fuel injectors 45, a single one of which is shown. Each fuel injector 45 is disposed to inject fuel into one of the combustion chambers 16. In one embodiment, the fuel injector 45 is arranged with a fuel nozzle that is disposed in a geometrically central portion of a cylindrical cross-section of the combustion chamber 16 and aligned with a longitudinal axis thereof. The fuel injector 45 fluidly and operatively couples to a fuel injection system, which supplies pressurized fuel at a flowrate that is suitable to operate the engine 100. The fuel injector 45 includes a flow control valve and a fuel nozzle that is disposed to inject fuel into the combustion chamber 16. The fuel may be a suitable composition such as, but not limited to, gasoline, ethanol, diesel, natural gas, and combinations thereof. The fuel nozzle may extend through the cylinder head 18 into the combustion chamber 16. Furthermore, the cylinder head 18 may be arranged with the fuel injector 45 and fuel nozzle disposed in a geometrically central portion of a cylindrical cross-section of the combustion chamber 16 and aligned with a longitudinal axis thereof. The fuel nozzle may be arranged in line with the combustion ignition device 30 between the intake valve 20 and the exhaust valve 22. Alternatively, the cylinder head 18 may be arranged with the fuel nozzle disposed in line with the combustion ignition device 30 and orthogonal to a line between the intake valve 20 and the exhaust valve 22. Alternatively, the cylinder head 18 may be arranged with the fuel nozzle disposed in a side injection configuration. Alternatively, the fuel injector 45 may be arranged in a port fuel injection configuration, wherein a fuel nozzle is disposed in the intake runner 24. The arrangements of the cylinder head 18 including the fuel nozzle and the combustion ignition device 30 described herein are illustrative. Other suitable arrangements may be employed within the scope of this disclosure.

Figure 2:
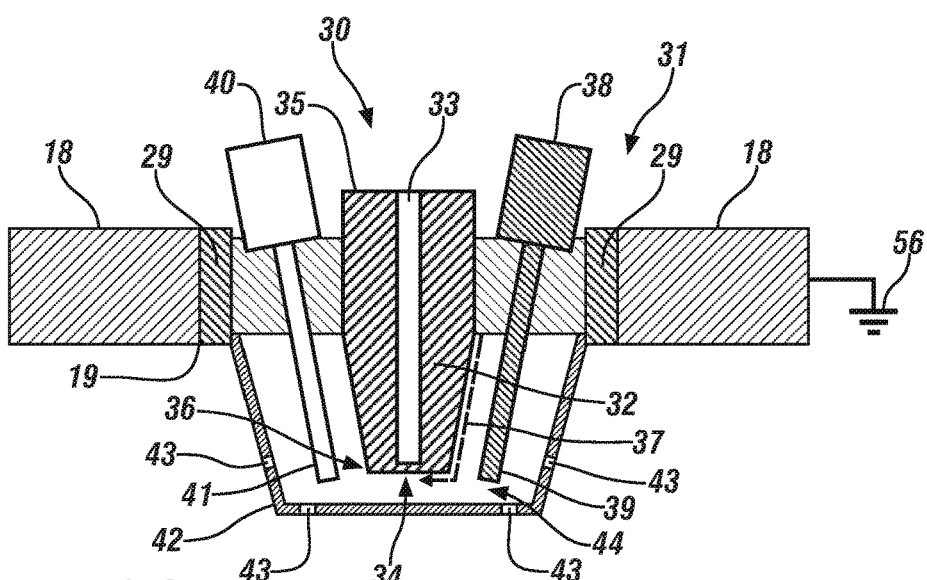
FIG. 2 schematically illustrates a cross-sectional side view of a combustion ignition device including an in-cylinder dielectric barrier-discharge plasma igniter, a pre-chamber fuel injector and a pre-chamber air injector, wherein the combustion ignition device is disposed to be mounted in a pass-through aperture of a cylinder head of an internal combustion engine, in accordance with the disclosure.

The cylinder head 18 may be arranged to provide structure for mounting the combustion ignition device 30, preferably in the form of a pass-through aperture 19. The cylinder head 18 electrically connects to an electrical ground 56. FIG. 2 schematically illustrates a cross-sectional side view of one embodiment of the combustion ignition device 30, which preferably includes an embodiment of the plasma igniter 31 including an end that is disposed within a pre-chamber 44 that is formed in a nozzle 42 having a plurality of apertures 43. The apertures 43 provide fluidic conduits through the nozzle 42 between the pre-chamber 44 and the combustion chamber 16. In one embodiment, there can be between three and ten apertures 43, each preferably cylindrically-shaped and having a diameter of about 320 microns. The apertures 43 are preferably disposed about a center-line axis of the cylinder bore 28 at equally-spaced angles, and targeted at an angle between 60 degrees and 160 degrees from the centerline axis of the cylinder bore 28. The pre-chamber 44 is fed by the fuel, air and combustion products contained in the combustion chamber 16.

In one embodiment, the combustion ignition device 30 also includes a pre-chamber air injector 40 including a tip portion 41 disposed in the pre-chamber. In one embodiment, the combustion ignition device 30 also includes a pre-chamber fuel injector 38 including a tip portion 39 disposed in the pre-chamber. In one embodiment, the combustion ignition device 30 also includes a pre-chamber air injector 40 and a pre-chamber fuel injector 38. The pre-chamber fuel injector 38 may be a suitable fuel injection device that is capable of controllably delivering fuel into the pre-chamber 44 while withstanding the in-cylinder temperature and pressure environment. The pre-chamber air injector 40 may be a suitable air injection device that is capable of delivering air into the pre-chamber 44 while withstanding the in-cylinder temperature and pressure environment.

Each plasma igniter 31 includes a single electrode 33 having a tip portion 34 that protrudes into the pre-chamber 44. The single electrode 33 and tip portion 34 are encapsulated in a dielectric coating 32, wherein the electrode 33 has the tip portion 34 near a second, distal end 36 that is opposite a first end 35 that electrically connects to the plasma ignition controller 50. In one embodiment, the dielectric coating 32 has a thickness that is within a range between 1 mm and 5 mm. The plasma igniter 31 is fixedly attached to a mounting boss 29 or another suitable structure. The mounting boss 29 preferably inserts through and attaches to the pass-through aperture 19 in the cylinder head 18 such that the pre-chamber 44 protrudes into the combustion chamber 16. A first end 35 of the electrode 33 electrically connects to the plasma ignition controller 50.

The dielectric coating 32 provides a dielectric barrier around the tip portion 34 of the electrode 33. As such, the tip portion 34 of the electrode 33 is fully encapsulated by the dielectric material that forms the dielectric coating 32. The dielectric coating 32 may be configured in a frustoconical shape that tapers in a narrowing fashion towards the distal end 36. This example is non-limiting, and the electrode 33 and dielectric coating 32 may be otherwise shaped and/or contoured relative to the contour of the distal end 36. The distal end 36 may be shaped, for example, as a conical end, a cylindrical end, a chamfered cylindrical end, etc. Other cross-sectional shapes, e.g., oval, rectangular, hexagonal, etc., may be employed. Other configurations of dielectric barrier-discharge plasma igniters may be employed with similar effect. The dielectric material may be a suitable dielectric material capable of withstanding the temperatures and pressures that can occur in an engine combustion chamber. For example, the dielectric material may be a glass, quartz, or ceramic dielectric material, such as a high purity alumina.

The plasma ignition controller 50 controls operation of the plasma igniter 31, employing electric power supplied from a power source 55, e.g., a DC power source. The plasma ignition controller 50 also electrically connects to the electrical ground path 56, thus forming an electrical ground connection to the cylinder head 18. The plasma ignition controller 50 electrically connects to each of the plasma igniters 31, preferably via a plurality of electrical cables 52, a single one of which is shown. The plasma ignition controller 50 includes control circuitry that is configured to generate a high-frequency, high-voltage electrical pulse that is supplied to each plasma igniter 31 via the electric cable 52 to generate a plasma discharge event that ignites fuel-air cylinder charges in response to control signals that may originate from the ECM 60. A current sensor may be disposed to monitor the electric cable 52 to detect electrical current that is supplied from the plasma ignition controller 50 to the plasma igniter 31 during each plasma discharge event. The current sensor may employ direct or indirect current sensing technologies in conjunction with signal processing circuits and algorithms to determine a parameter that is associated with the magnitude of current that is supplied to each plasma igniter 31. Such current sensing technologies may include, by way of non-limiting embodiments, induction, resistive shunt, or Hall effect sensing technologies.

During each plasma discharge event, the plasma ignition controller 50 operates to generate a high-frequency, high-voltage electrical pulse that is supplied to the electrode 33 via the electrical cable 52. In one example, the high-frequency, high-voltage electrical pulse may have a peak primary voltage of 100 V, secondary voltages between 10 and 70 kV, a duration of 2.5 ms, and a total energy of 1.0 J, with a frequency near one megahertz (MHz). The plasma discharge event generates one or a plurality of plasma discharge streamers 37 that originate at the mounting boss 29 and propagate towards the tip portion 34. A single plasma discharge streamer 37 is shown. The plasma discharge streamers 37 may propagate across a surface of a longitudinal portion of the dielectric coating 32 of the electrode 33 in multiple radial locations and terminate on the distal end 36 at or near the tip portion 34. The plasma discharge streamers 37 interact with and ignite the cylinder charge, which combusts in the combustion chamber 16 to generate mechanical power. The specific details of the configuration of the plasma igniter 31, its arrangement in the combustion chamber 16, and operating parameters (peak voltage, frequency and duration) associated with electric power and timing of activation during each plasma discharge event are application-specific, and are preferably selected to achieve desired combustion characteristics within the combustion chamber 16. The plurality of plasma discharge streamers 37 generate a large discharge area for effective flame development in cylinder charges that may be stoichiometric homogeneous, lean homogeneous, rich homogeneous, and/or lean/rich stratified and lean controlled auto-ignition in nature.

The engine 100 selectively operates in one of a plurality of combustion modes depending upon operating conditions. The disclosure may be applied to various engine systems and combustion cycles. In one embodiment, the engine 100 may be operably connected to a plurality of wheels disposed on one or more axles of a vehicle (not shown) to provide tractive power. For example, the engine 100 may be connected to a transmission (not shown) which may in turn rotate the one or more axles. The engine 100 may provide direct tractive power to the plurality of wheels, such as via the transmission connected to the one or more axles, or may provide power to one or more electric motors (not shown) that may in turn provide direct motive power to the plurality of wheels. The engine 100 may be configured to provide power to a vehicle by combusting fuel and converting chemical energy to mechanical energy. The engine 100 advantageously employs an embodiment of the plasma ignition system that includes the plasma ignition controller 50 and the plasma igniters 30 to facilitate stable low-temperature combustion of fuel/air cylinder charges that are highly dilute, and thus provide an alternative to a spark plug ignition system that can enhance low-temperature, dilute combustion at high combustion pressures while achieving robust lean low-temperature combustion.

In the embodiment described with reference to FIG. 1, the ECM 60 monitors inputs from engine and vehicle sensors to determine states of engine parameters. The ECM 60 is configured to receive operator commands, e.g., via an accelerator pedal and a brake pedal to determine an output torque request, from which engine control parameters and an engine torque command are derived. The ECM 60 executes control routines stored therein to determine states for the engine control parameters to control the aforementioned actuators to form a cylinder charge, including controlling throttle position, compressor boost, plasma ignition timing, fuel injection pulsewidth affecting injected fuel mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO). Engine parameters associated with a cylinder charge that are affected by individual engine control parameters may include air/fuel ratio, intake oxygen, engine mass airflow (MAF), manifold pressure (MAP) and mass-burn-fraction point (CA50 point). The air/fuel ratio may be controlled by the fuel injection pulsewidth and affects an amount of fuel injected into each combustion chamber 16 during each engine cycle. The engine mass airflow (MAF) and manifold pressure (MAP) are controlled by controlling NVO/PVO, electronic throttle control, and a turbocharger (when employed) and affects a magnitude of trapped air mass and a magnitude of residual gases in the combustion chamber 16. The intake oxygen may be controlled by the EGR valve, which controls a magnitude of external EGR during each engine cycle. The engine parameters of MAF, actual air/fuel ratio, intake oxygen, MAP and CA50 point may be directly measured using sensors, inferred from other sensed parameters, estimated, derived from engine models or otherwise dynamically determined by the ECM 60.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be periodically executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link 54, a wireless link or another suitable communications link. Communication includes exchanging data signals in a suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

As previously described, the plasma discharge streamers 37 may propagate across a surface of a longitudinal portion of the dielectric coating 32 of the electrode 33 in multiple radial locations and terminate on the distal end 36 at or near the tip portion 34 when the dielectric coating 32 around the electrode 33 is intact. The plasma discharge streamers 37 interact with and ignite the cylinder charge, which combusts in the combustion chamber 16 to generate mechanical power. The plasma discharge streamers 37 are low-temperature plasma streamers that may draw relatively lower currents, e.g., less than 10 mA in one embodiment.

Under engine operation that includes air/fuel ratios that range between stoichiometric and lean air/fuel ratio conditions, the combustion ignition device 30 may operate as a reactivity enhancer. This operation includes transforming the contents of the pre-chamber 44, i.e., air and fuel, into an active species such as O3, which can be expelled through the apertures 43 to react the cylinder charge in the combustion chamber 16, and may be in the form of low temperature reactive turbulent jets. The low temperature reactive turbulent jets that include the active species are capable of enhancing the reactivity of the air/fuel mixture that is contained therein. The combustion ignition device 30 thus introduces active species ($O_3$) that enhance the reactivity of the mixture in the pre-chamber 44 without active ignition thereof, thus limiting fouling. The highly reactive 'low-temperature' turbulent jet can enable combustion of ultra-lean/dilute mixtures that make up the cylinder charge. Under engine operation that includes air/fuel ratios that range between stoichiometric and rich conditions, the combustion ignition device 30 may operate as an igniter that operates to ignite the air and fuel mixture contained in the pre-chamber 44 for combustion and knock suppression of the cylinder charge in the combustion chamber 16. Dielectric barrier-discharge plasma igniters such as the plasma igniters 30 described herein are enabling technologies for dilute combustion engines, which may facilitate improved engine efficiency and reduced exhaust emissions. The concepts described herein facilitate implementation of dielectric barrier-discharge plasma igniters.

Figure 3:
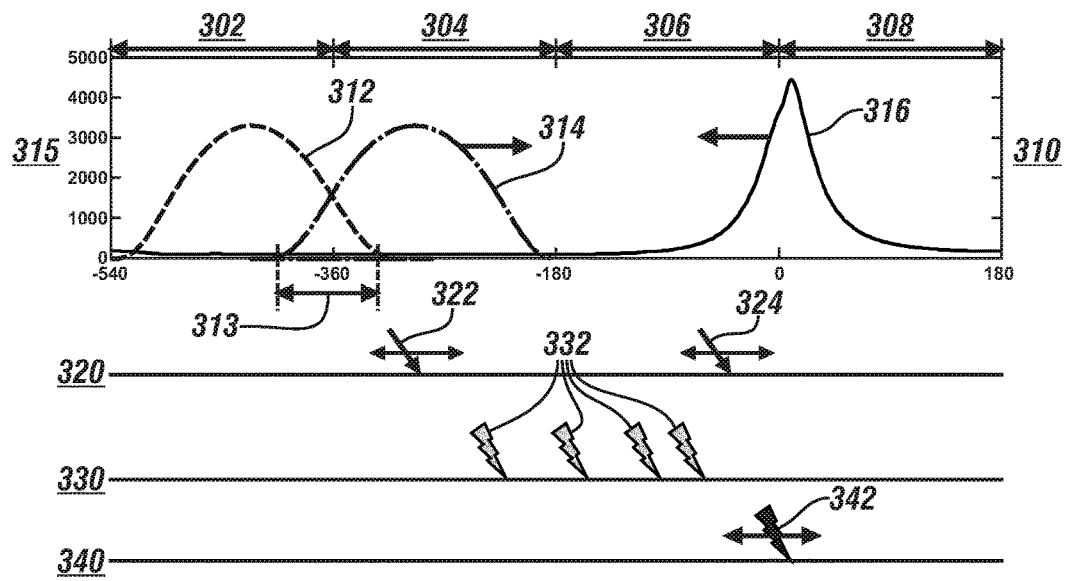
FIG. 3 graphically shows a timing chart associated with operation of an embodiment of the internal combustion engine that is described with reference to FIGS. 1 and 2 over a single engine cycle, including timing of operation of a dielectric barrier-discharge plasma igniter for reactivity enhancement and/or combustion ignition, in accordance with the disclosure.

FIG. 3 graphically shows a timing chart associated with operation of an embodiment of the internal combustion engine 100 including the combustion ignition device 30 that is described with reference to FIGS. 1 and 2 over a single engine cycle, including intake, compression, expansion and exhaust strokes 302, 304, 306 and 308, respectively. This graph includes timing of operation of the plasma igniter 31 for reactivity enhancement and/or combustion ignition. Engine operation data includes valve lift and timing (mm) 315, including exhaust valve lift 312 and intake valve lift 314, which are shown in relation to the corresponding exhaust stroke 302 and intake stroke 304, respectively, and cylinder pressure 310. A period of positive valve overlap 313 is indicated. The concepts described herein also apply to control routines that include negative valve overlap conditions. Engine data also includes the in-cylinder pressure 316, which peaks at the beginning of the power stroke 308. Engine control data includes fuel injection events 320 that are injected into the combustion chamber 16. As shown, there is a first fuel injection event 322 that preferably occurs and ends during the intake stroke 304, and an optional second fuel injection event 324 that preferably occurs and ends during the compression stroke 306. Engine control data also includes reactivity events 330 in the form of a plurality (four as shown) of plasma discharge events 332 that preferably occur at the end of the intake stroke 304 and/or during an early part of the compression stroke 308. Alternatively, or in addition, the engine control data includes ignition events 340 in the form of a plasma discharge event 342 that preferably occurs at the end of the compression stroke 306 to effect ignition of the cylinder charge.

Figure 4:
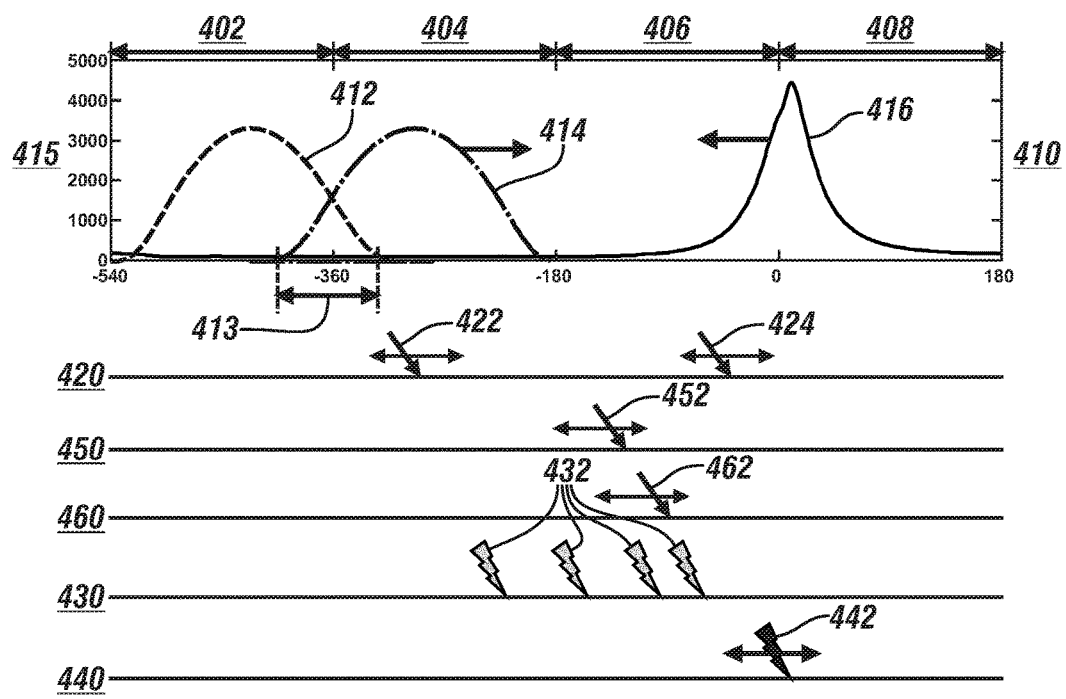
FIG. 4 graphically shows a timing chart associated with operation of an embodiment of the internal combustion engine that is described with reference to FIGS. 1 and 2 over a single engine cycle, including timings related to activation of the pre-chamber fuel injector, a pre-chamber air injector, and a dielectric barrier-discharge plasma igniter for reactivity enhancement and/or combustion ignition, in accordance with the disclosure.

FIG. 4 graphically shows a timing chart associated with operation of an embodiment of the internal combustion engine 100 including the combustion ignition device 30 that is described with reference to FIGS. 1 and 2 over a single engine cycle, including intake, compression, expansion and exhaust strokes 402, 404, 406 and 408, respectively. This graph includes timing of operation of the plasma igniter 31 for reactivity enhancement and/or combustion ignition. Engine operation data includes valve lift and timing (mm) 415, including exhaust valve lift 412 and intake valve lift 414, which are shown in relation to the corresponding exhaust stroke 402 and intake stroke 404, respectively, and cylinder pressure 410. A period of positive valve overlap 413 is indicated. The concepts described herein also apply to control routines that include negative valve overlap conditions. Engine data also includes the in-cylinder pressure 416, which peaks at the beginning of the power stroke 408. Engine control data includes fuel injection events 420 that are injected into the combustion chamber 16. As shown, there is a first fuel injection event 422 that preferably occurs and ends during the intake stroke 404, and an optional second fuel injection event 424 that preferably occurs and ends during the compression stroke 406. Engine control data also pre-chamber air injection events 450, including pre-chamber air injection event 452 that occurs during the compression stroke 406. A single pre-chamber air injection event 452 is shown, but there may be multiple events executed. Engine control data also pre-chamber fuel injection events 460, including a pre-chamber fuel injection event 462 that occurs during the compression stroke 406, and preferably after the pre-chamber air injection event 452, if any. A single pre-chamber fuel injection event 462 is shown, but there may be multiple events executed. Engine control data also includes reactivity events 430 in the form of a plurality (four as shown) of plasma discharge events 432 that preferably occur at the end of the intake stroke 404 and/or during an early part of the compression stroke 406. Alternatively, or in addition, the engine control data includes ignition events 440 in the form of a plasma discharge event 442 that preferably occurs at the end of the compression stroke 406 to ignite the cylinder charge.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A combustion ignition device disposed in a combustion chamber of an internal combustion engine, comprising:
   a nozzle defining a pre-chamber; and
   a barrier discharge plasma igniter, including a tip portion disposed in the pre-chamber, wherein the barrier discharge plasma igniter comprises a groundless barrier discharge plasma igniter;
   wherein the nozzle defines a plurality of apertures therein; and
   wherein the pre-chamber is in fluidic communication with the combustion chamber via the plurality of apertures.

2. The combustion ignition device of claim 1, further comprising a controller that is operatively connected to the internal combustion engine and the barrier discharge plasma igniter, the controller including an instruction set, the instruction set executable to activate the barrier discharge plasma igniter to enhance reactivity of a fuel/air mixture contained in the pre-chamber.

3. The combustion ignition device of claim 1, further comprising a controller that is operatively connected to the internal combustion engine and the barrier discharge plasma igniter, the controller including an instruction set, the instruction set executable to activate the barrier discharge plasma igniter to ignite a fuel/air mixture contained in the pre-chamber.

4. The combustion ignition device of claim 1, further comprising a pre-chamber air injector including a tip portion disposed in the pre-chamber.

5. The combustion ignition device of claim 1, further comprising a pre-chamber fuel injector including a tip portion disposed in the pre-chamber.

6. The combustion ignition device of claim 1, further comprising a pre-chamber fuel injector including a tip portion disposed in the pre-chamber and a pre-chamber air injector including a tip portion disposed in the pre-chamber.

7. The combustion ignition device of claim 6, further comprising a controller that is operatively connected to the internal combustion engine, the pre-chamber fuel injector, the pre-chamber air injector and the barrier discharge plasma igniter, the controller including an instruction set, the instruction set executable to activate the pre-chamber air injector, the pre-chamber fuel injector and the barrier discharge plasma igniter to enhance reactivity of a fuel/air mixture contained in the pre-chamber.

8. The combustion ignition device of claim 6, further comprising a controller that is operatively connected to the internal combustion engine, the pre-chamber fuel injector, the pre-chamber air injector and the barrier discharge plasma igniter, the controller including an instruction set, the instruction set executable to activate the pre-chamber air injector, the pre-chamber fuel injector and the barrier discharge plasma igniter to ignite a fuel/air mixture contained in the pre-chamber.

9. The combustion ignition device of claim 1, wherein the barrier discharge plasma igniter comprises an electrode including a tip portion that is encapsulated in a dielectric material.

10. The combustion ignition device of claim 1, further comprising a plasma ignition controller in communication with the barrier discharge plasma igniter and electrically connected to an electrical ground path that is connected to the engine.

11. The combustion ignition device of claim 10, wherein the plasma ignition controller is disposed to execute a plasma discharge event in the combustion chamber via the barrier discharge plasma igniter.

12. The combustion ignition device of claim 10, wherein the plasma ignition controller is disposed to apply a high-frequency, high-voltage electrical pulse to the barrier discharge plasma igniter.

13. An internal combustion engine, comprising:
- a cylinder bore, a cylinder head and a piston cooperating to form a combustion chamber;
- a fuel injector disposed to inject fuel to the combustion chamber; and
- a combustion ignition device disposed in the combustion chamber and including:
  - a nozzle defining a pre-chamber,
  - a barrier discharge plasma igniter, including a tip portion disposed in the pre-chamber, wherein the barrier discharge plasma igniter comprises a groundless barrier discharge plasma igniter,
- wherein the nozzle defines a plurality of apertures therein; and
- wherein the pre-chamber is in fluidic communication with the combustion chamber via the plurality of apertures.

14. The internal combustion engine of claim 13, further comprising a controller that is operatively connected to the fuel injector and the barrier discharge plasma igniter, the controller including an instruction set, the instruction set executable to:
- activate the fuel injector to form a fuel/air mixture in the combustion chamber; and
- activate the barrier discharge plasma igniter to enhance reactivity of a fuel/air mixture contained in the pre-chamber.

15. The internal combustion engine of claim 13, further comprising a controller that is operatively connected to the fuel injector and the barrier discharge plasma igniter, the controller including an instruction set, the instruction set executable to:
- activate the fuel injector to form a fuel/air mixture in the combustion chamber; and
- activate the barrier discharge plasma igniter to ignite the fuel/air mixture.

* * * * *